J. D. PETERS.
FORCE FEEDING ATTACHMENT FOR CORN SHELLERS.
APPLICATION FILED FEB. 25, 1922.
1,435,419. Patented Nov. 14, 1922.
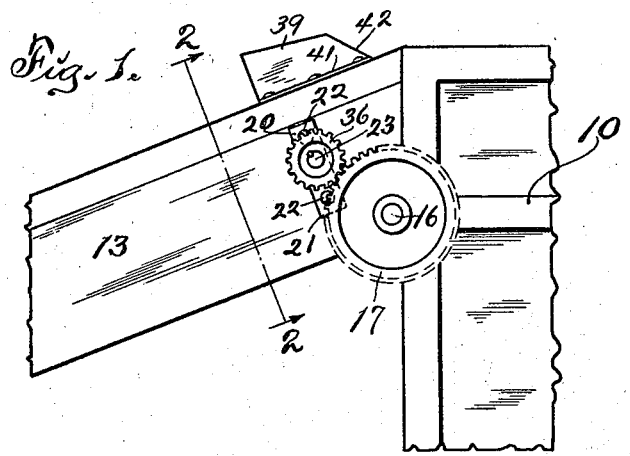
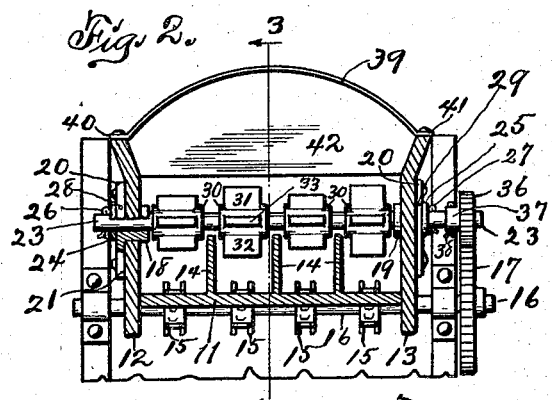
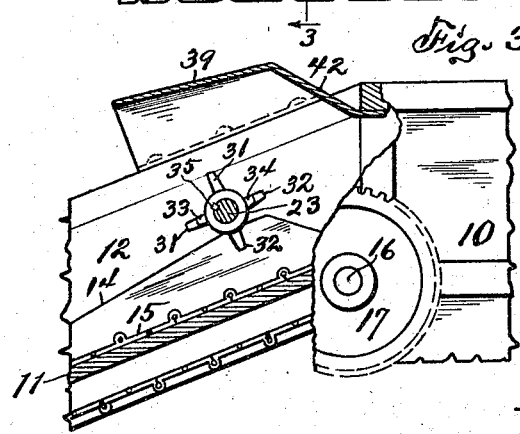
Inventor:
John D. Peters
By Silas L. Sweet
Atty Patented Nov. 14, 1922.

1,435,419

UNITED STATES PATENT OFFICE.

JOHN D. PETERS, OF WESTFIELD TOWNSHIP, PLYMOUTH COUNTY, IOWA.

FORCE-FEEDING ATTACHMENT FOR CORN SHELLERS.

Application filed February 25, 1922. Serial No. 539,034.

*To all whom it may concern:*

Be it known that I, JOHN D. PETERS, a citizen of the United States of America, and resident of Westfield Township, Plymouth County, Iowa, have invented a new and useful Force-Feeding Attachment for Corn Shellers, of which the following is a specification.

An object of this invention is to provide means for accelerating the feeding of ear corn to a sheller.

A further object of this invention is to provide an improved construction for a force-feeding attachment for corn-shellers.

A further object of this invention is to provide an improved construction of a beater or force-feeding unit for an attachment for corn-shellers.

My invention consists in the construction, arrangement and combination of elements hereinafter set forth, pointed out in the claims and illustrated by the accompanying drawing, in which—

Figure 1 is a side elevation of conventional portions of a corn-sheller, showing my improvements applied thereto. Figure 2 is a cross-section on the indicated line 2—2 of Figure 1. Figure 3 is an elevation, on an enlarged scale, partly in section on the indicated line 3—3 of Figure 2.

In the construction of the apparatus as shown the numeral 10 designates generally the frame of a corn-sheller in which the shelling mechanism is contained and operated in a common manner. A self-feeding attachment of common form is mounted on one end of the frame 10 and is employed to receive and feed ear corn to the shelling mechanism within the frame. The self-feeding attachment includes a hopper having a bottom 11 and side-walls 12, 13, preferably made of wood and suitably connected, mounted in inclined position. The width of the hopper preferably is subdivided, where the shelling mechanism is multiple, by division irons or partitions 14 arranged longitudinally of, fixed to and rising from the bottom 11, and conveyors 15 are arranged for travel in and longitudinally of the feeding spaces between the partitions and are driven by a shaft 16 extending across the hopper adjacent to the frame 10. This is a common construction for self-feeding devices for cornshellers and the shaft 16 preferably is driven by a pinion 17 on one end thereof outside of the hopper. Registering holes are bored in the forward upper end portions of the side walls 12, 13 of the hopper and annular journal bearings 18, 19 are mounted in said holes and extend through said walls. Ears 20, 21 are formed integrally with and extend upward and downward from outer end portions of the bearings 18, 19, the ears 21 being of greater length than the ears 20. The ears 20, 21 are formed with bolt holes, are arranged substantially vertically and in contact with the outer surfaces of the walls 12, 13 and are secured to said walls by bolts 22, thus stabilizing the bearings in the walls. A beater shaft 23 is journaled in the bearings 18, 19, extends across the hopper and projects at both ends outside said bearings. Washers 24, 25 are mounted on the shaft 23 adjacent the outer ends of the bearings 18, 19 and pins or cotters 26, 27 are removably and replaceably mounted through said shaft adjacent said washers and prevent material longitudinal movement of the shaft in the bearings. Oil holes 28, 29 are formed, in inclined positions, in the ears 20 and intersect the bearing surfaces of the shaft 23 for lubrication thereof. Beaters or wing wheels 30, corresponding in number with the "holes" of the corn-sheller, are mounted end to end on the shaft 23 and the wings thereof intersect the feeding spaces in the hopper. Each beater or wing wheel 30 is formed with a hub adapted to be keyed to the shaft 23 and radial wings, preferably four in number, arranged quartering on the hub. Two of the wings 31, 32, diametrically opposite each other are of substantially double, in radial length, the remaining wings 33, 34; the latter wings also being arranged diametrically opposite each other and alternating with the former wings in the circumference of the hub. The beaters or wing wheels are mounted on the shaft in such manner that part of the longer wings align with part of the shorter wings and alternate therewith in the length of the shaft. The shaft 23 is formed with a key-way between the bearings 18, 19 and the hubs of the beaters or wing wheels 30 are formed with key-ways adapted to register therewith; and keys 35, one for each hub, are mounted in said key-ways and lock the hubs against rotation on the shaft. The key-way in a hub is arranged between the radial planes of adjacent wings (Fig. 3), A pinion 36, formed with a hub 37, is mounted on one end portion of the shaft 23 and is secured thereto by a pin or cotter 38 mounted through said hub and shaft. The pinion 36 also may be keyed to the shaft 23 as shown in Figure 1. The pinion 36 meshes with the pinion 17 and is driven thereby and in a direction opposite thereto. Thus provision is made for driving the beaters or wing wheels so that the wings thereof will supplement the conveyors 15 in advancing ear corn in the hopper. The pinion 36 is of less diameter than the pinion 17 in order that the beaters or wing wheels may rotate at greater speed than the conveyors and accelerate the delivery of ear corn to the shelling mechanism. To this end the wings 31, 32, 33 and 34 engage ears of corn carried by the conveyors 15 and push or knock them toward the shelling mechanism. It is important that alternate wings be of different lengths. Having two long wings only on the beater results in the lapse of too much time between successive contacts with ears of corn. Having four long wings on each beater tends to clogging by contact of alternate beaters with intermediate portions of the ears of corn. Making the wings of different lengths results in efficient clearance and accelerated delivery of the ears to the shelling mechanism. A concaved shield or guard 39, preferably made of sheet metal, is arched across the hopper, above the beater shaft and beaters and is formed with plane flanges 40, 41 overlaying and adapted to be secured to the upper margins of the side walls 12, 13. The upper forward portion 42 of the shield 39 is inclined and extended forwardly beneath a top portion of the frame 10. The shield or guard 39, with its inclined extended portion 42 serves to retain the ears of corn against accidental discharge from the hopper and also guards the hands and clothing of the operator from the beaters and shaft 23.

The use and operation of the attachment as above described results in material and considerable acceleration of the feeding of ear corn to a sheller, thereby forcing the feed beyond that of the conveyors 15.

I claim as my invention—

1. The combination with a corn-sheller and a self-feeder communicating therewith having partitions longitudinally thereof and conveyors between said partitions, of a force-feeding attachment mounted on the self-feeder comprising a driven shaft and beaters on said shaft adapted to extend between said partitions in the vertical planes of said conveyors and engage ears of corn on said conveyors.

2. A force-feeding attachment for corn-shellers comprising a beater shaft and beaters thereon, each beater being formed with alternating long and short wings.

3. The combination with a self-feeder having a hopper and conveyors therein, of a shaft journaled in the walls of and extending across said hopper above the conveyors, and beaters arranged end to end on said shaft, each beater being formed with alternating long and short wings.

4. In a machine of the class described, a beater formed with a hub and radial wings, said wings being of alternately varying lengths.

5. In a machine of the class described, a support formed with registering holes, journal bearings in said holes, ears on said bearings fixed to said support, a shaft journaled in said bearings, and beaters on said shaft between said bearings, each beater being formed with alternating long and short wings.

6. In a machine of the class described, a support, journal bearings on said support, a driven shaft journaled in said bearings, pins in said shaft adapted to limit endwise movement thereof, and beaters on said shaft between the bearings formed with alternating long and short radial wings.

Signed at Le Mars, in the county of Plymouth and State of Iowa, this 20th day of February, 1922.

JOHN D. PETERS.